United States Patent
Hoshino et al.

[11] Patent Number: 6,049,761
[45] Date of Patent: Apr. 11, 2000

[54] VEHICULAR TRAVELING DIRECTION MEASURING SYSTEM

[75] Inventors: Ken-ichi Hoshino, Toyokawa; Nobuharu Kobayashi, Toyohashi; Hiroto Mizutani; Hiroki Teraoka, both of Okazaki, all of Japan

[73] Assignee: Nippondenso Co., Ltd., Tokyo, Japan

[21] Appl. No.: 08/014,574

[22] Filed: Feb. 5, 1993

[30] Foreign Application Priority Data

Feb. 5, 1992 [JP] Japan .................................. 4-019982
Dec. 8, 1992 [JP] Japan .................................. 4-327687

[51] Int. Cl.$^7$ .................................................. G01C 17/38
[52] U.S. Cl. ............................ 702/92; 33/355 R; 33/357
[58] Field of Search ................... 364/559, 571.01, 364/571.02, 571.04, 571.05, 571.06, 571.07, 571.08; 33/355 R, 356, 357; 702/92, 93, 94, 95, 150

[56] References Cited

U.S. PATENT DOCUMENTS

| | | | |
|---|---|---|---|
| 4,413,424 | 11/1983 | Sasaki et al. | 364/559 X |
| 4,497,034 | 1/1985 | Kuno et al. | 364/559 X |
| 4,593,359 | 6/1986 | Sadeh | 33/356 X |
| 4,672,565 | 6/1987 | Kuno et al. | 364/571 |
| 4,771,547 | 9/1988 | Akutsu et al. | 33/356 |
| 4,989,333 | 2/1991 | Helldörfer et al. | 364/559 X |
| 5,023,799 | 6/1991 | Nakayama et al. | 33/356 X |
| 5,046,031 | 9/1991 | Wanous | 364/559 X |
| 5,170,354 | 12/1992 | Ueno et al. | 364/571.05 X |
| 5,253,424 | 10/1993 | Kendall | 33/355 R X |
| 5,287,295 | 2/1994 | Ives et al. | 364/571.01 |
| 5,297,063 | 3/1994 | Cage | 364/571.01 X |
| 5,297,065 | 3/1994 | Cage et al. | 364/571.05 |

FOREIGN PATENT DOCUMENTS

| | | |
|---|---|---|
| 58-22911 | 2/1983 | Japan . |
| 58-24811 | 2/1983 | Japan . |
| 62-96814 | 5/1987 | Japan . |

OTHER PUBLICATIONS

Neter et al., *Applied Statistics*, Allyn & Bacon Inc., 1988, pp. 814–819 and 857–863.

*Primary Examiner*—Eric B. Stamber
*Attorney, Agent, or Firm*—Pillsbury Madison & Sutro LLP

[57] ABSTRACT

A vehicular traveling direction measuring system derives a weighting constant based on a monitored magnitude of the geomagnetic disturbance around a vehicle. Variance values of geomagnetism indicative data and a deviation magnitude from a standard azimuth circle may be used to estimate the geomagnetic disturbance magnitude. Mean data is derived from current cycle data and prior cycle data of the monitored geomagnetism using the weighting constant. The weighting constant determines a rate of dependency upon the current cycle data and the prior cycle data when deriving the mean data. The vehicular traveling direction is derived based on the derived mean data.

9 Claims, 7 Drawing Sheets

VEHICULAR TRAVELING DIRECTION MEASURING SYSTEM

BACKGROUND OF THE INVENTION

1. Field of the Invention

The present invention relates generally to a system for measuring a traveling direction or azimuth of a vehicle based on the geomagnetism around the vehicle and, more specifically, to a vehicular traveling direction measuring system which is capable of providing an accurate measurement of a traveling direction of the vehicle even when the environmental geomagnetism is disturbed.

2. Description of the Prior Art

When the vehicle is running on a bridge or on a high level road, geomagnetic disturbance components are increased in the output of the geomagnetic sensor installed on a vehicle body. The geomagnetic disturbance components are caused by magnetic metallic structural members, such as, steel frames and steel reinforcing rods, of the bridge or the high level road. Under such conditions, it is difficult to detect a traveling direction of the vehicle precisely with the conventional system of the type which derives the vehicular traveling direction based on the monitored geomagnetism around the vehicle.

In order to overcome the above-noted defects inherent in the conventional system, it has been proposed to average the output values of the geomagnetic sensor and to calculate the vehicular traveling direction based on the averaged sensor output data.

However, in order to obtain practically reliable averaged sensor output data which is substantially free from the affection of the magnetic disturbance components, an averaging time period for the sensor output data inevitably increases, leading to deterioration of the response characteristic of the system particularly when the vehicle turns a curve or a corner along the road.

SUMMARY OF THE INVENTION

Therefore, it is an object of the present invention to provide an improved vehicular traveling direction measuring system that can eliminate the above-noted defects inherent in the prior art.

To accomplish the above-mentioned and other objects, according to one aspect of the present invention, a system for measuring a traveling direction of a vehicle in cycles comprises a geomagnetic sensor for detecting the geomagnetism around the vehicle; magnetic disturbance deriving means for deriving a magnitude of magnetic disturbance based on values of the detected geomagnetism output from the geomagnetic sensor; weight setting means for setting weight upon a current cycle value of the detected geomagnetism and a prior cycle value of the detected geomagnetism depending on the derived magnetic disturbance magnitude; mean data deriving means for deriving mean data from the current cycle value and the prior cycle value using the set weight; and traveling direction deriving means for deriving the traveling direction of the vehicle based on the derived mean data.

According to another aspect of the present invention, a system for measuring a traveling direction of a vehicle in cycles comprises a geomagnetic sensor for monitoring the geomagnetism around the vehicle; magnetic disturbance deriving means for deriving a magnitude of magnetic disturbance based on first data indicative of the geomagnetism monitored by the geomagnetic sensor; weight setting means for setting weight upon second data derived from the first data in a current cycle and upon third data, depending on the derived magnetic disturbance magnitude; mean data deriving means for deriving mean data from the second data and the third data using the set weight, the third data representing the mean data derived in a prior cycle; and traveling direction deriving means for deriving the traveling direction of the vehicle based on the derived mean data.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings:

FIGS. 8(1), (2) and (3) are graphs respectively showing variations of values CX, CY and CR which are components of a weighting constant CC;

DESCRIPTION OF THE PREFERRED EMBODIMENT

Referring now to the drawings, a first preferred embodiment of the present invention will be described with reference to FIGS. 1 to 9.

Figure 1:
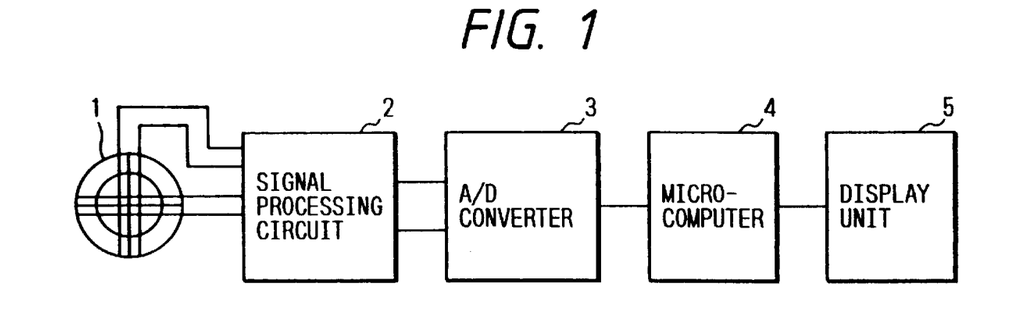
FIG. 1 is a schematic block diagram showing an overall structure of a vehicular traveling direction measuring system according to first and second preferred embodiments of the present invention.

FIG. 1 is a schematic diagram showing an overall structure of a traveling direction measuring system for a vehicle according to the first preferred embodiment of the present invention.

In FIG. 1, the system includes a geomagnetic sensor 1, a signal processing circuit 2, an A/D converter 3 and a microcomputer 4 which is connected to a known display unit 5. The geomagnetic sensor 1 is of a flux gate type as disclosed, for example, in the U.S. Pat. No. 4,672,565 and the U.S. Pat. No. 4,771,547, and is arranged on a vehicular roof panel in a horizontal posture. The geomagnetic sensor 1 resolves the geomagnetism around the vehicle into two directional components, the two directions being perpendicular to each other on a horizontal plane, and outputs the two directional component data in the form of electrical signals (X, Y) indicative of a coordinate position on an X-Y coordinate plane. The outputs X and Y of the geomagnetic sensor 1 are processed through the signal processing circuit 2 and converted into digital signals through the A/D converter 3 per a predetermined unit time, for example, every 0.98 msec. to be input to the microcomputer 4.

The microcomputer 4 receives the converted digital signals from the A/D converter 3 and performs calculation to derive directional data D, which will be described later in detail. The directional data D is output to the display unit 5 which displays the vehicular traveling direction based on the input directional data D.

Figure 2:
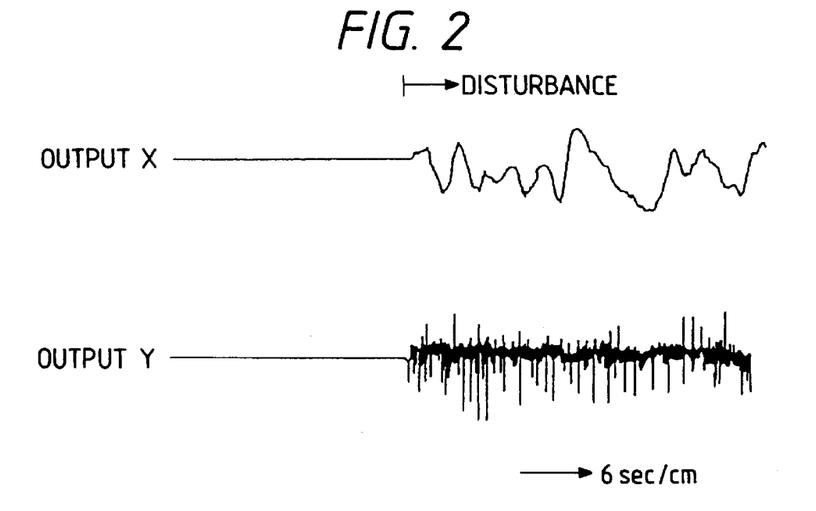
FIG. 2 is a diagram showing waveforms for explaining variations of outputs from a signal processing circuit due to the geomagnetic disturbance around the vehicle.
Figure 3:
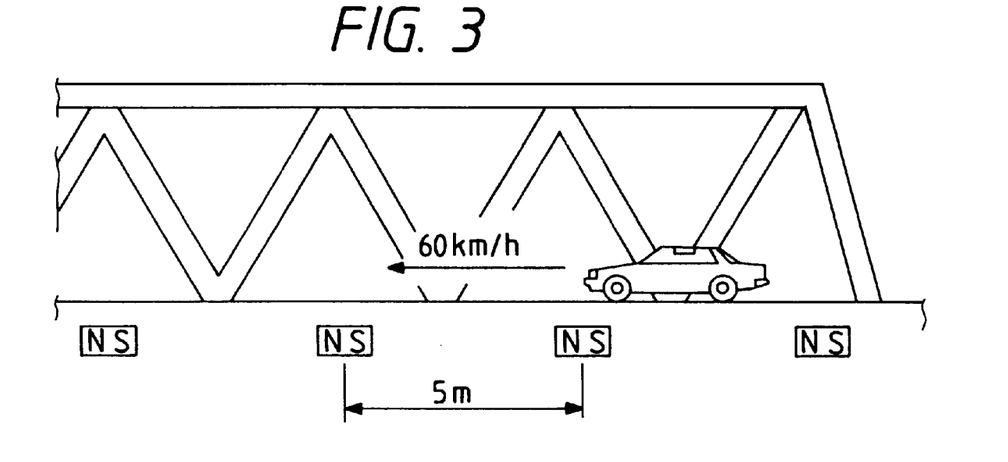
FIG. 3 is a diagram for explaining frequency components caused by the geomagnetic disturbance when the vehicle is running on a bridge.

Before explaining the detailed processing performed by the microcomputer 4, the general and fundamental operations of the microcomputer 4 will be first described hereinbelow:

When the vehicle is running on the bridge or the high level road, the output values X and Y from the signal processing circuit 2 are normally disturbed as respectively shown in FIG. 2. As shown in FIG. 3, when the steel frames of the bridge are arranged with intervals of 5 meters and the vehicle runs on the bridge at the speed of 60 km/h, a frequency component of the magnetic disturbance caused by the steel frames becomes about 3 Hz.

On the other hand, since making one turn of the vehicle requires at least 5 seconds, a frequency component in the sensor output becomes no more than 0.2 Hz when the vehicle turns.

Accordingly, the frequency components in the sensor output caused by the magnetic disturbance and the vehicle turn significantly differ from each other and thus are clearly discriminative. Based on this precondition, the microcomputer 4 derives variance values of the sensor output data X and Y per a predetermined unit time so as to detect an amount or magnitude of the magnetic disturbance around the vehicle. Using the variance values as indices of the disturbance amount also facilitates numerical calculation of the microcomputer 4.

On the other hand, although using the variance values of the sensor output data X and Y makes it possible to discriminate between the vehicle turn and the magnetic disturbance generated when the vehicle is traveling at the normal speed, it is difficult to discriminate between the vehicle turn and the magnetic disturbance generated when the vehicle is stopped or moving at a slow speed since a time-lapse variation of the magnetic disturbance is small under this condition.

When the vehicle makes one turn under the uniform geomagnetism, an output circle is described on the X-Y coordinate plane using coordinate positions each defined by the sensor outputs X and Y. Accordingly, a direction from a center of the output circle toward a coordinate position defined by the sensor outputs X and Y indicates a traveling direction of the vehicle. When the vehicle is magnetized or when a magnetization level on the vehicle is changed due to the disturbance of the environmental geomagnetism, the center of the output circle is caused to vary or move, thus resulting in an error in measurement of the traveling direction of the vehicle. To correct this error, one turn of the vehicle is required to derive a new center of a corresponding output circle and a radius thereof as disclosed, for example, in the U.S. Pat. No. 4,672,565 and the U.S. Pat. No. 4,771,547.

Figure 4:
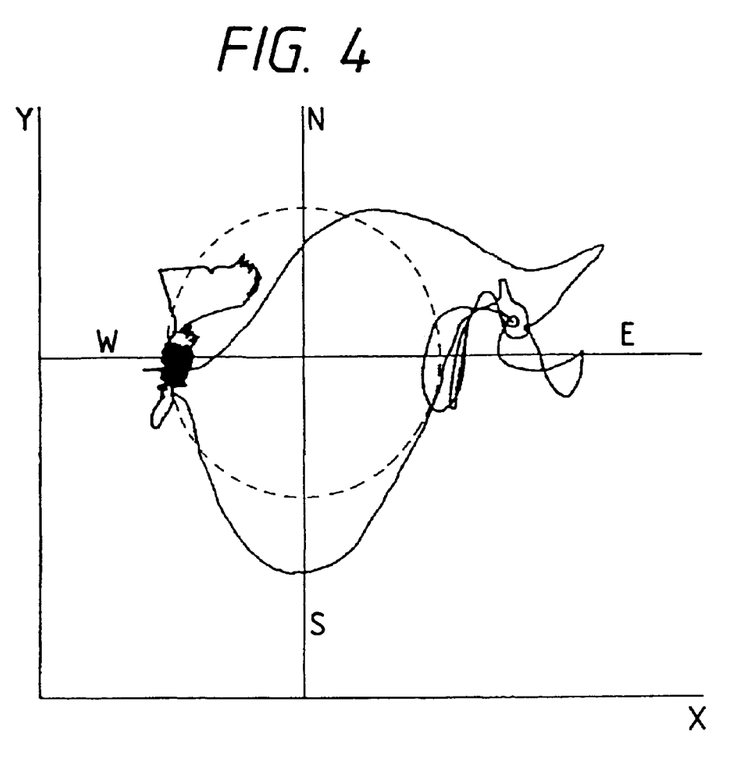
FIG. 4 is a diagram for explaining deviation of sensor outputs from a standard azimuth circle due to the geomagnetic disturbance around the vehicle.

Accordingly, when no magnetic disturbance exists, the coordinate position defined by the sensor outputs X and Y should fall on the corresponding output circle. However, as shown in FIG. 4, coordinate positions each defined by X and Y coordinate values of the sensor outputs deviate from the corresponding output circle (hereinafter referred to as "standard azimuth circle") when the vehicle is traveling such as on the bridge. A magnitude of the deviation becomes larger as a magnitude of the disturbance becomes larger. Based on this precondition, the microcomputer 4 derives a ratio based on distances between the center coordinate of the standard azimuth circle and the X coordinate value and between the center coordinate of the standard azimuth circle and the Y coordinate value and radii of the standard azimuth circle. The microcomputer 4 decides that the disturbance magnitude is larger as the derived ratio deviates from "1" more largely.

Now, the operation or the processing of the microcomputer 4 will be described in detail hereinbelow with reference to flowcharts of FIGS. 5 through 7 which are respectively executed by the microcomputer 4 as timer interrupt routines.

Figure 5:
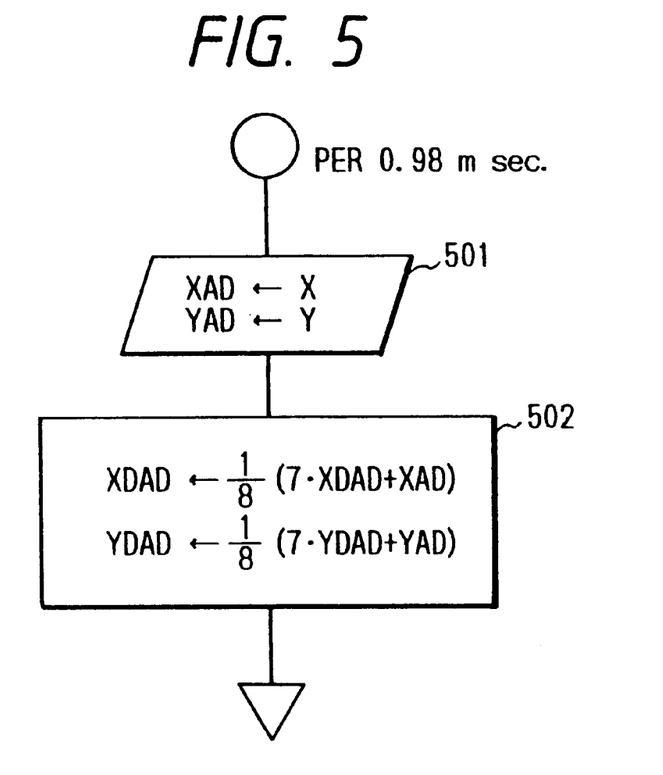
FIG. 5 shows a flowchart to be executed by a microcomputer every 0.98 msec. according to the first and second preferred embodiments of the present invention.

FIG. 5 shows the interrupt routine to be executed per a predetermined unit time, for example, every 0.98 msec. for averaging the output data of the geomagnetic sensor 1.

At a first step 501, the sensor output data X and Y are respectively converted into digital data XAD and YAD by the A/D converter 3. Subsequently, at a step 502, the converted data XAD and YAD are respectively averaged by the following equations to derive mean values XDAD and YDAD, respectively:

$$XDAD \leftarrow (7XDAD+XAD)/8$$

$$YDAD \leftarrow (7YDAD+YAD)/8$$

Figure 6:
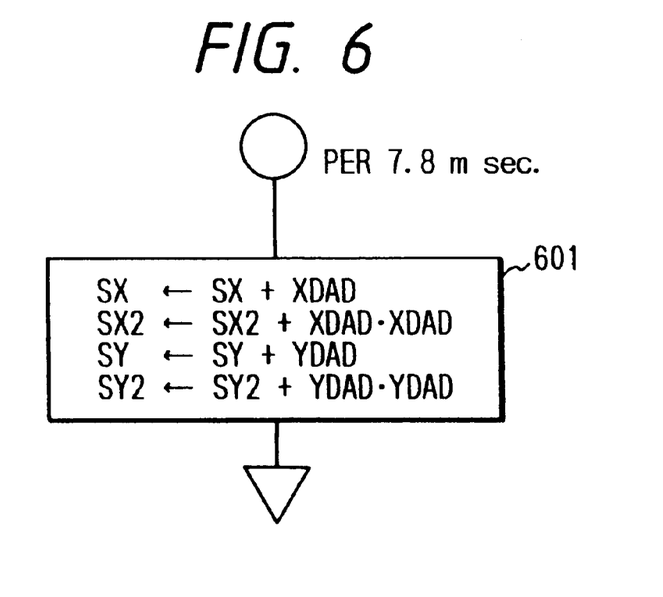
FIG. 6 shows a flowchart to be executed by the microcomputer every 7.8 msec. according to the first and second preferred embodiments of the present invention.

FIG. 6 shows the interrupt routine to be executed per a predetermined unit time, for example, every 7.8 msec. for adding the mean values XDAD and YDAD per 7.8 msec.

At a step 601, integrated values SX, SX2, SY and SY2 are respectively derived using the following equations:

$$SX \leftarrow SX+XDAD$$

$$SX2 \leftarrow SX2+XDAD \cdot XDAD$$

$$SY \leftarrow SY+YDAD$$

$$SY2 \leftarrow SY2+YDAD \cdot YDAD$$

Figure 7:
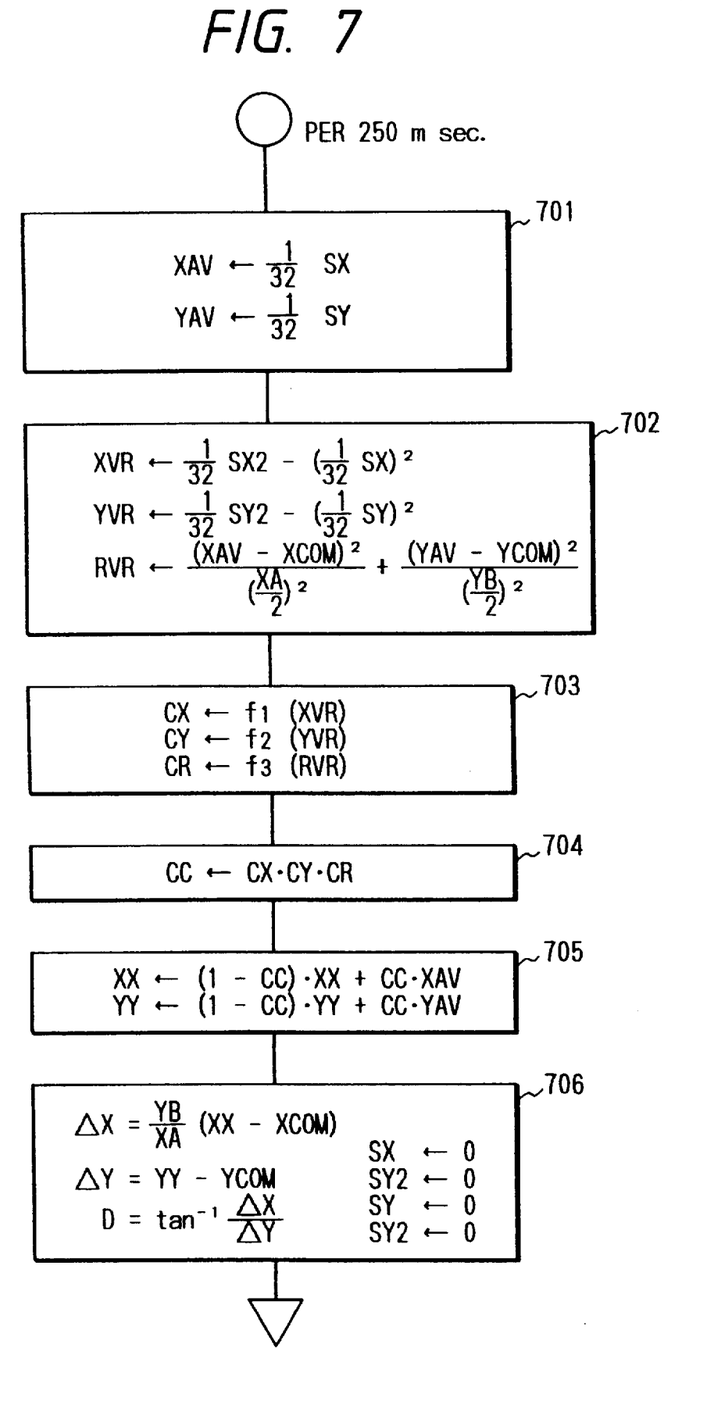
FIG. 7 shows a flowchart to be executed by the microcomputer every 250 msec. according to the first and second preferred embodiments of the present invention.
Figure 8:
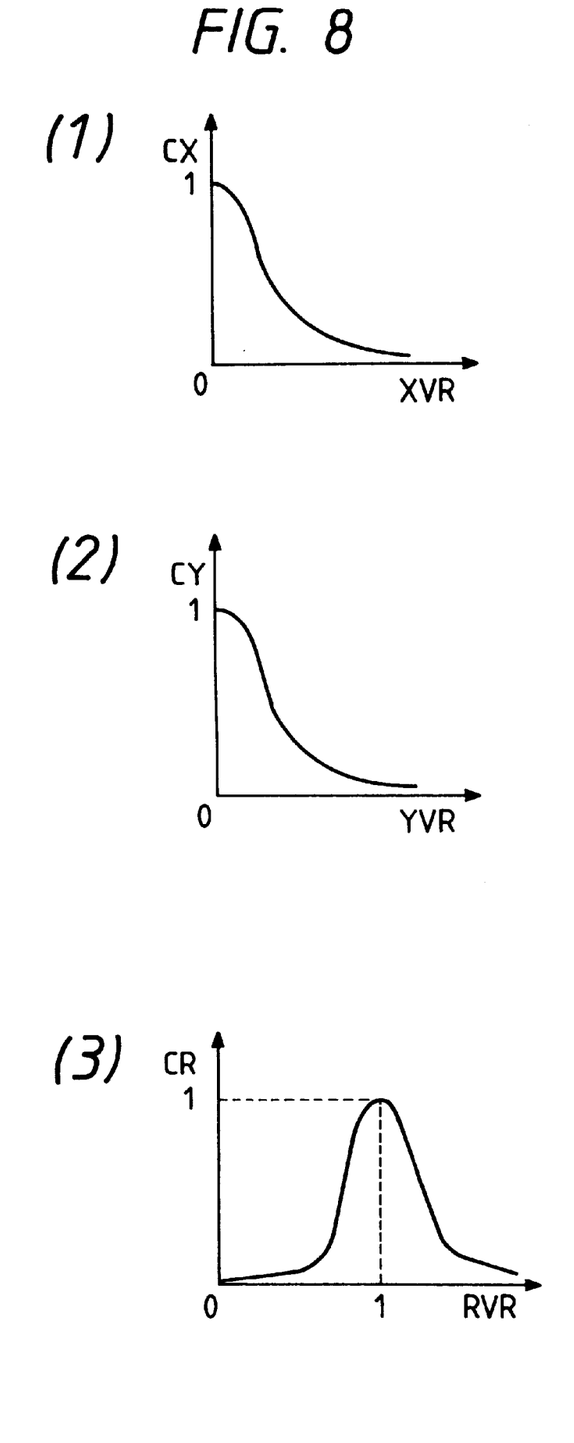

FIG. 7 shows the interrupt routine to be executed per a predetermined unit time, for example, every 250 msec. for deriving a traveling direction D of the vehicle.

At a first step 701, mean values XAV and YAV are respectively derived by the following equations:

$$XAV \leftarrow SX/32$$

$$YAV \leftarrow SY/32$$

At a step 702, variance values XVR and YVR as well as a deviation amount or magnitude RVR from the standard azimuth circle are respectively derived based on the following equations:

$$XVR \leftarrow SX2/32 - (SX/32)^2$$

$$YVR \leftarrow SY2/32-(SY/32)^2$$

$$RVR \leftarrow (XAV \leftarrow XCOM)^2/(XA/2)^2$$

$$+(YAV-YCOM)^2/(YB/2)^2$$

wherein, XCOM and YCOM respectively represent X and Y coordinate values of the center of the standard azimuth circle, and XA and YB respectively represent diameters of the standard azimuth circle along X and Y axes. These data XCOM, YCOM, XA and YB are respectively stored in a memory of the microcomputer 4 when the correction is made by making one turn of the vehicle.

Subsequently, at a step 703, values CX, CY and CR as components of a weighting constant or coefficient CC are derived as functions of the variance value XVR, the variance value YVR and the deviation amount RVR, respectively. Specifically, FIG. 8(1) shows a curved line representative of variation of the weighting component value CX with respect to the variance value XVR, FIG. 8(2) shows a curved line representative of variation of the weighting component value CY with respect to the variance value YVR and FIG. 8(3) shows a curved line representative of variation of the weighting component value CR with respect to the deviation amount RVR. Accordingly, the values CX, CY and CR are fixedly determined or identified based on the derived values XVR, YVR and RVR, respectively. The values CX, CY and CR have been obtained with respect to the respective values XVR, YVR and RVR through various simulation tests and prestored in a memory of the microcomputer 4. The values CX, CY and CR respectively show the reliability of the output data of the geomagnetic sensor 1 which have been used in the current cycle of this interrupt routine. Specifically, a value "1" of each of the values CX, CY and CR represents the maximum reliability, meaning that no magnetic disturbance component is included in the current sensor output data which thus can be used as data for a later-described traveling direction calculation with no correction. On the other hand, a smaller value thereof represents less reliability, meaning that a larger magnetic disturbance is included in the current sensor output data which thus can be used at a smaller degree as the data for the later-described traveling direction calculation.

In practice, however, to facilitate the calculation, the values CX, CY and CR have been preset with respect to given divided ranges of the values XVR, YVR and RVR, respectively, as shown in Tables 1, 2 and 3, instead of using approximate expressions of the curved lines shown in FIG. 8(1), (2) and (3).

TABLE 1

| XVR ($T^2$) | CX |
| --- | --- |
| $0 \sim 7 \times 10^{-11}$ | 1 |
| $7 \times 10^{-11} \sim 1.8 \times 10^{-10}$ | 1/2 |
| $1.8 \times 10^{-10} \sim 3.6 \times 10^{-10}$ | 1/4 |
| $3.6 \times 10^{-10} \sim 1.0 \times 10^{-8}$ | 1/6 |
| $1.0 \times 10^{-8} \sim \infty$ | 1/32 |

(T: tesla)

TABLE 2

| XVR ($T^2$) | CY |
| --- | --- |
| $0 \sim 7 \times 10^{-11}$ | 1 |
| $7 \times 10^{-11} \sim 1.8 \times 10^{-10}$ | 1/2 |
| $1.8 \times 10^{-10} \sim 3.6 \times 10^{-10}$ | 1/4 |
| $3.6 \times 10^{-10} \sim 1.0 \times 10^{-8}$ | 1/16 |
| $1.0 \times 10^{-8} \sim \infty$ | 1/32 |

(T: tesla)

TABLE 3

| RVR | CR |
| --- | --- |
| $0 \sim 0.05$ | 1/128 |
| $0.05 \sim 0.25$ | 1/32 |
| $0.25 \sim 0.5$ | 1/8 |
| $0.5 \sim 0.75$ | 1/2 |
| $0.75 \sim 1.25$ | 1 |
| $1.25 \sim 1.50$ | 1/2 |
| $1.50 \sim 1.75$ | 1/8 |
| $1.75 \sim 2.0$ | 1/32 |
| $2.0 \sim \infty$ | 1/128 |

Subsequently, at a step 704, the weighting constant CC is derived using the following equation:

$$CC \leftarrow CX \cdot CY \cdot CR$$

As clearly understood from this equation, the weighting constant CC represents the total reliability upon the output data of the geomagnetic sensor 1. In the above equation, however, when CX. CY. CR <1/128, then CC is set to 1/128 (CC=1/128).

Now, the routine proceeds to a step 705 where final mean sensor output values XX and YY are respectively derived based on the following equations:

$$XX \leftarrow (1-CC) \cdot XX + CC \cdot XAV$$

$$YY \leftarrow (1-CC) \cdot YY + CC \cdot YAV$$

wherein, XX and YY in the right side of the equations respectively represent final mean sensor output values XX and YY which were derived and stored in the last or immediately preceding cycle of this interrupt routine. As clearly understood from the above-noted equations, as the weighing constant CC approaches closer to the value "1", the final mean sensor output values XX and YY of the current cycle of this interrupt routine respectively include higher rates of the preliminary mean sensor output value XAV and YAV derived in the current cycle of this interrupt routine, relative to the last or prior final mean sensor output values XX and YY derived in the last cycle of this interrupt routine. On the other hand, as the weighting constant CC moves away from the value "1" toward a smaller value, the final mean sensor output values XX and YY in the current cycle of this interrupt routine respectively include higher rates of the prior final mean sensor output values XX and YY relative to the preliminary mean sensor output values XAV and YAV of the current cycle of this interrupt routine. In other words, the weighting constant CC determines a rate of dependency or reliability upon a coordinate position defined by the preliminary mean sensor output values XAV and YAV of the current interrupt cycle and a coordinate position defined by the prior final mean sensor output values XX and YY of the prior interrupt cycle so as to determine a coordinate position defined by the final mean sensor values XX and YY of the current interrupt cycle between the two coordinate positions.

Figure 9:
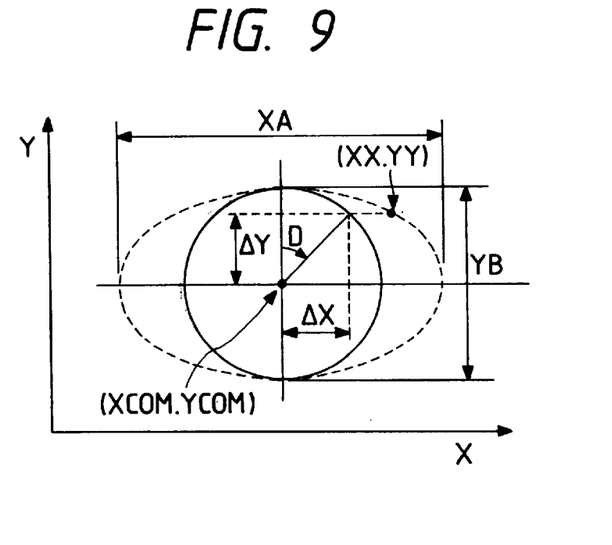
FIG. 9 is a diagram for explaining derivation of a vehicular traveling direction when the standard azimuth circle is an ellipse.

Subsequently, the routine proceeds to a final step 706 where the traveling direction D of the vehicle is derived based on the following equations:

$$\Delta X = YB(XX-XCOM)/XA$$

$$\Delta Y = YY-YCOM$$

$$D = \tan^{-1} \Delta X/\Delta Y$$

wherein, the equation for $\Delta X$ can also deal with the standard azimuth circle being an ellipse as shown by a dotted line in FIG. 9.

The derived traveling direction data D is output to the display unit 5 which then displays the traveling direction of the vehicle based on the direction data D.

The step 706 further resets the values SX, SX2, SY and SY2 to zero for a subsequent interrupt routine of FIG. 6.

As understood from the foregoing description, when the variance values XVR and YVR and the deviation amount RVR each representing a magnitude of the magnetic disturbance are larger, a weighting constant (1−CC) for the prior sensor output data XX and YY is set larger, on the other hand, when the disturbance magnitude indicative values XVR, YVR and RVR are smaller, the weighting constant CC for the current sensor output data XAV and YAV is set larger. Accordingly, when the disturbance indicative values XVR, YVR and RVR are large, the final mean sensor output values XX and YY are derived mainly based on the prior sensor output data XX and YY, i.e. the sensor output data including substantially no magnetic disturbance components. On the other hand, when the disturbance indicative values XVR, YVR and RVR are small, the final mean sensor output values XX and YY are derived mainly based on the current sensor output data XAV and YAV, i.e. the sensor output data including substantially no magnetic disturbance components. Accordingly, the reliability of the traveling direction data D which is derived based on the final mean sensor output values XX and YY is highly improved.

In the foregoing first preferred embodiment, although the weighting constants CC and 1−CC are respectively set for the current sensor output data XAV and YAV and the prior sensor output data XX and YY, it is readily possible to only set the weighting constant CC since the two equations at the step 705 can be rewritten as follows:

$$XX \leftarrow XX+CC \cdot (XAV-XX)$$

$$YY \leftarrow YY+CC \cdot (YAV-YY)$$

Further, instead of setting the weighting constants CC and 1−CC, a rate of the sampling numbers for the current sensor output data XAV and YAV and for the prior sensor output data XX and YY may be variably set depending on the disturbance indicative values XVR, YVR and RVR.

Further, in the foregoing first preferred embodiment, although the vehicular traveling direction D is derived every 250 msec., it is preferable to increase this cycle to, for example, 1 to 2 seconds in order to ensure the display stability. Similarly, in order to ensure the display stability, it may be arranged that, when the current weighting constant CC is smaller than the prior weighting constant CC, then the current weighting constant CC is used, on the other hand, when the current weighting constant CC is larger than the prior weighting constant CC, then a mean value between the current and prior weighting constants CC is used, or increasing the current weighting constant CC in multi-stages.

Still further, in the foregoing first preferred embodiment, although the A/D conversion cycle is set to 0.98 msec. and the sampling cycle is set to 7.8 msec., these cycles may be shortened to improve the accuracy of the measurement of the vehicular traveling direction.

Still further, although the variance values XVR and YVR are used to estimate the magnitude of the magnetic disturbance around the vehicle, it may be arranged to perform the frequency analysis using the method of the fast Fourier transformation so as to estimate the disturbance indicative values XVR and YVR more precisely. Further, instead of using the variance values XVR and YVR, the standard deviation values may be used to estimate the magnitude of the magnetic disturbance around the vehicle.

Figure 10:
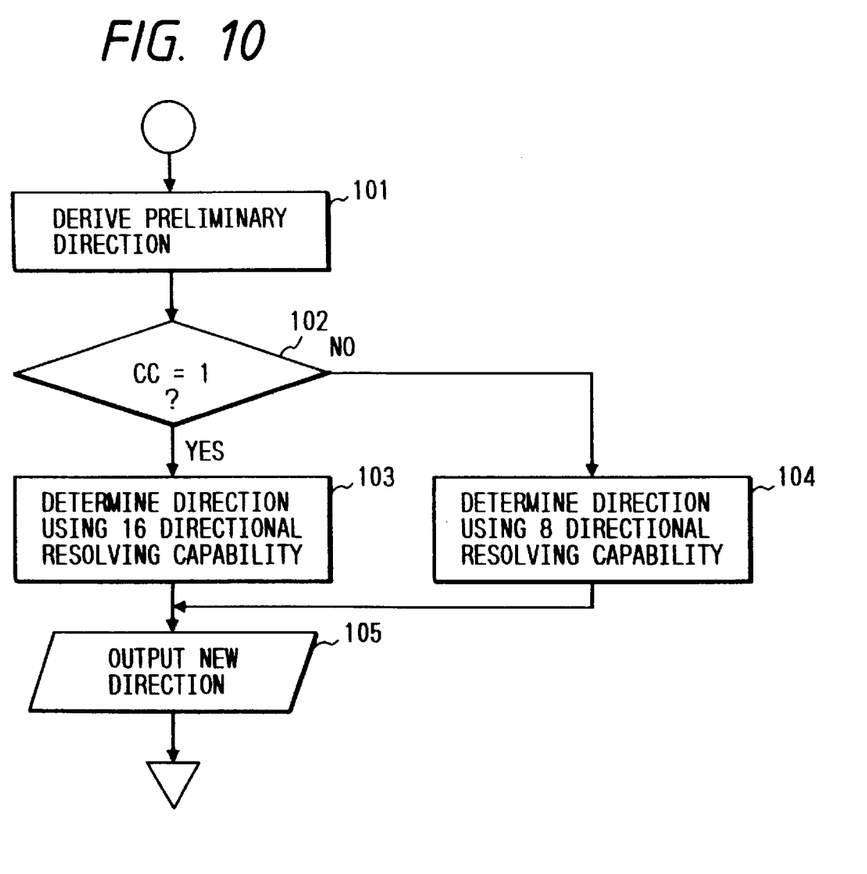
FIG. 10 shows a flowchart to be executed by the microcomputer according to the second preferred embodiment of the present invention.
Figure 11:
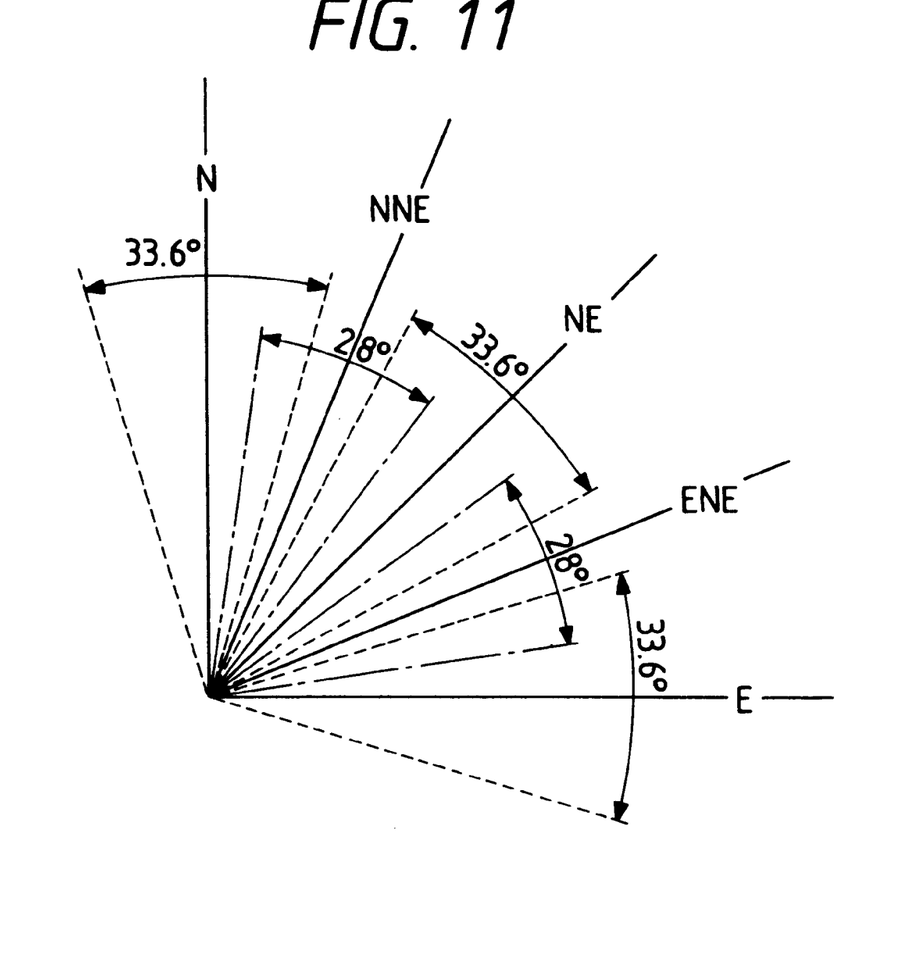
FIG. 11 is a diagram for explaining derivation of a new preliminary direction in the flowchart of FIG. 10.

Now, a second preferred embodiment of the present invention will be described hereinbelow with reference to FIGS. 10 and 11.

The second preferred embodiment aims to improve the display stability under particular conditions of the geomagnetic disturbance where the display instability is caused even in the system of the first preferred embodiment.

The vehicular traveling direction measuring system according to the second preferred embodiment includes, as the first preferred embodiment, the geomagnetic sensor 1, the signal processing circuit 2, the A/D converter 3 and the microcomputer 4 which is connected to the known display unit 5 as shown in FIG. 1.

The microcomputer 4 performs the same processing as in the first preferred embodiment to derive the vehicular traveling direction data D. In the second preferred embodiment, the microcomputer 4 further performs processing identified by a flowchart in FIG. 10, which will be described in detail hereinbelow.

In the second preferred embodiment, in order to put a weight on the current displayed direction, the concept of hysterisis is introduced for deriving a new traveling direction of the vehicle.

At a first step 101, a preliminary vehicular traveling direction is derived based on the direction data D. Specifically, as shown in FIG. 11, the main eight directions (N, NE, E - - - ) are respectively assigned directional areas or widths of 33.6° and the eight sub-directions (NNE, ENE - - - ) are respectively assigned directional areas of 28°. Assuming that the current displayed direction is "NE" and the derived direction data D represents a direction within the directional area of "NE", the step 101 determines "NE" as the preliminary vehicular traveling direction. On the other hand, assuming that a direction represented by the direction data D is outside the directional area of "NE", the step 101 determines the direction represented by the direction data D as the preliminary traveling direction of the vehicle.

Through subsequent steps 102 through 105, a final or for-display vehicular traveling direction is determined from the derived preliminary direction using the weighting constant CC derived at the step 704 in FIG. 7 in the first preferred embodiment, and is output to the display unit 5.

Specifically, the step 102 checks whether the weighting constant CC is "1". If answer at the step 102 is YES, the routine goes to the step 103 where the for-display direction is determined based on Table 4. On the other hand, if answer at the step 102 is NO, i.e. the weighting constant CC is less than "1", the routine goes to the step 104 where the for-display direction is determined based on Table 5. In Table 4, since the reliability of the preliminary direction is relatively high, the resolving capability for the for-display direction is set to 16 directions. On the other hand, in Table 5, since the reliability of the preliminary direction is relatively low, the resolving capability for the for-display direction is set to 8 directions.

TABLE 4

| | P | | | | | | | | | |
|---|---|---|---|---|---|---|---|---|---|---|
| D | N | NNW | NW | WNW | W | WSW | SW | ENE | NE | NNE |
| N | N | NNW | NNW | NNW | NNW | NNW | NNW | NNE | NNE | NNE |
| NNW | N | NNW | NW | NW | NW | NW | NW | N | N | N |
| NW | NNW | NNW | NW | WNW | WNW | WNW | WNW | NNW | NNW | NNW |
| WNW | NW | NW | NW | WNW | W | W | W | NW | NW | NW |
| W | WNW | WNW | WNW | WNW | W | WSW | WSW | WNW | WNW | WNW |

(P: preliminary direction, D: displayed direction)

TABLE 5

| | P | | | | | | | | | |
|---|---|---|---|---|---|---|---|---|---|---|
| D | N | NNW | NW | WNW | W | WSW | SW | ENE | NE | NNE |
| N | N | N | NNW | NNW | NNW | NNW | NNW | NNE | NNE | N |
| NNW | N | NNW | NW | NW | NW | NW | NW | N | N | N |
| NW | NNW | NW | NW | NW | WNW | WNW | WNW | NNW | NNW | NNW |
| WNW | NW | NW | NW | WNW | W | W | W | NW | NW | NW |
| W | WNW | WNW | WNW | W | W | W | WSW | WNW | WNW | WNW |

(P: preliminary direction, D: displayed direction)
The determination of the new for-display direction will be described herein below using Tables 4 and 5.
It is assumed that answer at the step 102 is positive, i.e. the weighting constant cc is "1".

When the current displayed direction is "N" and the preliminary direction is "NW", "NNW" is determined as the new for-display direction. On the other hand, when the current displayed direction is "N" and the preliminary direction is "NW", "NNW" is tentatively determined as the new for-display direction. After lapse of 250 msec., now the current displayed direction is "NNW" so that "NW" is determined as the new for-display direction. The reason for interposing this intermediate decision is to display the directional variation smoothly when the displayed direction changes from "N" to "NW".

Now, it is assumed that answer at the step 102 is negative, i.e. the weighting constant CC is less than When the current displayed direction is "N" and the preliminary direction is "NNW", "N" is determined as the new for-display direction. On the other hand, when the current displayed direction is "N" and the preliminary direction is "NW", "NNW" is tentatively determined as the new for-display direction. After lapse of 250 msec., now the current displayed direction is "NNW", "NW" is determined as the new for-display direction. The reason for interposing this intermediate decision is the same as in the case of the weighting constant CC being "1".

In the manner as described above, the new for-display direction is determined and output to the display unit 5 which displays the direction based on the input for-display direction.

As appreciated from the foregoing description, the second preferred embodiment improves the display stability particularly under such geomagnetic disturbed conditions where the display instability is caused even in the system of the first preferred embodiment.

It is to be understood that this invention is not to be limited to the preferred embodiments and modifications described above, and that various changes and modifications may be made without departing from the spirit and scope of the invention as defined in the appended claims.

What is claimed is:

1. An electronic apparatus for measuring a traveling direction of a vehicle in cycles, comprising:
   a geomagnetic sensor mounted to the vehicle for detecting geomagnetism around the vehicle and outputting electric signals corresponding to the geomagnetism;
   an electronic calculator receiving the electric signals from the geomagnetic sensor, said calculator including:
   current cycle value deriving means for deriving a current cycle value of a coordinate position of the geomagnetism detected by the geomagnetic sensor based on the electric signals,
   deviation magnitude deriving means for deriving a magnitude of a deviation between the current cycle value and an item associated with a standard azimuth circle,
   weight setting means for setting a weighting for the current cycle value of the geomagnetism and a prior cycle value of the geomagnetism depending on the magnitude of the deviation in each cycle such that the current cycle value has a smaller weight than the prior cycle value as the magnitude of the deviation increases,
   mean data deriving means for deriving mean data from said current cycle value and said prior cycle value using said weighting, and
   traveling direction deriving means for deriving the traveling direction of the vehicle based on said mean data; and
   means for producing a signal indicating a traveling direction of the vehicle based on an output of said traveling direction deriving means.

2. The apparatus as set forth in claim 1, wherein said geomagnetic sensor is a flux gate type sensor which resolves the geomagnetism into two directional components.

3. The apparatus as set forth in claim 2, wherein said current cycle value deriving means derives a mean value of the electric signals in a predetermined time period, said mean value having X coordinate value XAV and Y coordinate value YAV.

4. The apparatus as set forth in claim 3, wherein said deviation magnitude deriving means derives the magnitude of the deviation, RVR, based on a following equation, $$RVR=(XAV-XCOM)^2/(XA/2)^2+(YAV-YCOM)^2/(YB/2)^2$$

wherein, XCOM and YCOM respectively represent X and Y coordinate values of a center of the standard azimuth circle, and XA and YB respectively represent diameters of the standard azimuth circle along X and Y axes.

5. The apparatus as set forth in claim 2, wherein said calculator further includes variance value deriving means for deriving variance values of the electric signals in a predetermined time period, and said mean data deriving means derives said mean data based on said variance values and said magnitude of the deviation.

6. The apparatus as set forth in claim 2, wherein said calculator further includes variance value deriving means for deriving variance values of the electric signals in a predetermined time period, and said weight setting means sets said weighting based on said variance values and said magnitude of the deviation.

7. The apparatus as set forth in claim 2, wherein said calculator further includes switching means for switching a directional resolving capability of the traveling direction depending on said weighting in such a way that said directional resolving capability is increased when the current cycle value has a larger weight than the prior cycle value.

8. The apparatus as set forth in claim 2, wherein said calculator further includes selector means for selecting one of a plurality of pre-stored differently ranked directional resolving characteristics depending on said weighting.

9. An electronic apparatus for measuring a traveling direction of a vehicle in cycles, comprising:

a geomagnetic sensor mounted to the vehicle for detecting geomagnetism around the vehicle and outputting electric signals corresponding to the geomagnetism;

an electronic calculator receiving the electric signals from the geomagnetic sensor, said calculator including:

current cycle value deriving means for deriving a current cycle value of a coordinate position of the geomagnetism detected by the geomagnetic sensor based on the electric signals, deviation magnitude deriving means for deriving magnitude of a deviation between the current cycle value and an item associated with a standard azimuth circle, weight setting means for setting a weighting for the current cycle value of the geomagnetism and another cycle value depending on the magnitude of the deviation in the current cycle and the another cycle such that the current cycle value has a smaller weight than the another cycle value as the magnitude of the deviation increases, mean data deriving means for deriving mean data from said current cycle value and said another cycle value using said weighting, and traveling direction deriving means for deriving the traveling direction of the vehicle based on said mean data; and means for producing a signal indicating a traveling direction of the vehicle based on an output of said traveling direction deriving means.

* * * * *